US006542162B1

(12) United States Patent
Hrusecky et al.

(10) Patent No.: US 6,542,162 B1
(45) Date of Patent: Apr. 1, 2003

(54) COLOR MAPPED AND DIRECT COLOR OSD REGION PROCESSOR WITH SUPPORT FOR 4:2:2 PROFILE DECODE FUNCTION

(75) Inventors: David A. Hrusecky, Johnson City, NY (US); Bryan J. Lloyd, Johnson City, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/094,753

(22) Filed: Jun. 15, 1998

(51) Int. Cl.[7] ............................ H04N 5/445; G06K 9/00; G09G 5/02; G09G 5/00; G09G 5/36
(52) U.S. Cl. ..................... 345/629; 345/589; 345/597; 345/549; 345/601; 345/604; 348/564; 348/566; 348/569; 382/162; 382/166; 382/167
(58) Field of Search ............................... 345/604, 605, 345/629, 630, 634, 641, 636, 690, 698, 593, 597, 619, 632, 638, 640, 589, 591, 601, 545–549; 348/560, 562, 563, 564, 565, 566, 569, 582, 584, 586, 554, 607, 581, 588, 705; 382/162, 163, 164, 165, 166, 167; 386/83, 46

(56) References Cited

U.S. PATENT DOCUMENTS

| 4,383,296 A | | 5/1983 | Sander ..................... 364/200 |
| 4,533,909 A | | 8/1985 | Sander ..................... 340/703 |
| 4,580,134 A | * | 4/1986 | Campbell ................. 340/703 |
| 4,871,948 A | | 10/1989 | Nelson ...................... 315/368 |
| 5,012,331 A | | 4/1991 | Schuster .................... 358/37 |
| 5,046,119 A | | 9/1991 | Hoffert et al. ............. 382/56 |
| 5,065,143 A | | 11/1991 | Greaves et al. ........... 340/701 |
| 5,081,523 A | | 1/1992 | Frazier ...................... 358/29 |
| 5,311,212 A | | 5/1994 | Beretta ..................... 345/150 |
| 5,334,992 A | | 8/1994 | Rochat et al. ............. 345/22 |
| 5,345,554 A | | 9/1994 | Lippincott et al. ........ 395/162 |
| 5,367,339 A | | 11/1994 | Lippincott ................. 348/592 |
| 5,489,947 A | | 2/1996 | Cooper ...................... 348/589 |
| 5,506,604 A | | 4/1996 | Nally et al. ................ 345/154 |
| 5,673,398 A | * | 9/1997 | Takeda ...................... 395/285 |
| 5,696,539 A | * | 12/1997 | Welti ......................... 345/199 |
| 5,828,383 A | * | 10/1998 | May et al. ................. 345/507 |
| 5,959,680 A | * | 9/1999 | Bril ........................... 348/446 |
| 6,002,411 A | * | 12/1999 | Dye ........................... 345/521 |
| 6,108,014 A | * | 8/2000 | Dye ........................... 345/507 |
| 6,157,374 A | * | 12/2000 | West ......................... 345/203 |
| 6,157,396 A | * | 12/2000 | Margulis ................... 345/506 |
| 6,317,164 B1 | * | 11/2001 | Hrusecky et al. ......... 348/581 |

* cited by examiner

Primary Examiner—Matthew C. Bella
Assistant Examiner—Wesner Sajous
(74) Attorney, Agent, or Firm—John R. Pivnichny; William H. Steinberg, Esq.; Heslin, Rothenberg, Farley & Mesiti P.C.

(57) ABSTRACT

An on-screen display (OSD) processor, processing method and article of manufacture are provided having a color mapped mode, direct color mode, and 4:2:2 profile mode. The OSD processor implements both color mapped OSD region processing capability and direct color OSD region processing capability, along with an ability to store quantizer coefficients for the 4:2:2 profile mode of a video decoder coupled to the OSD processor. The capabilities of the OSD processor are implemented using a common embedded memory within the processor. During color mapped OSD region processing, color table data is temporarily stored within the embedded memory, while in direct color OSD region processing, direct color descriptions are stored within the embedded memory. When the video decoder is decoding a 4:2:2 formatted image, the embedded memory of the OSD processor is used to temporarily store inverse quantization data for the decode function.

14 Claims, 12 Drawing Sheets

```
X X X X X X X X X X X X X ← LINE 1
O     O     O     O     O     O     O
X X X X X X X X X X X X X ← LINE 2

X X X X X X X X X X X X X ← LINE 3
O     O     O     O     O     O     O
X X X X X X X X X X X X X ← LINE 4
        X REPRESENTS LUMINANCE SAMPLES
        O REPRESENTS CHROMINANCE SAMPLES
```

*fig. 5*

```
⊗ X ⊗ X ⊗ X ⊗ X ⊗ X ⊗ X ⊗ ← LINE 1
⊗ X ⊗ X ⊗ X ⊗ X ⊗ X ⊗ X ⊗ ← LINE 2
⊗ X ⊗ X ⊗ X ⊗ X ⊗ X ⊗ X ⊗ ← LINE 3
⊗ X ⊗ X ⊗ X ⊗ X ⊗ X ⊗ X ⊗ ← LINE 4
        X REPRESENTS LUMINANCE SAMPLES
        O REPRESENTS CHROMINANCE SAMPLES
```

*fig. 6*

COLOR MAPPED m x n REGION MEMORY ORGANIZATION

CONTROL HEADER
 —LINK ADDRESS
 —SCREEN COORDINATES
 —BLEND VALUE
 —REGION SIZE
 —RESOLUTION CONTROL
 —...etc

COLOR TABLE

COLOR DESCRIPTION 1 (BLUE)
 → COLOR DESCRIPTION 2 (RED)
 COLOR DESCRIPTION 3 (GREEN)
 COLOR DESCRIPTION 4 (DARK BLUE)
  ⋮
 —UP TO 256 COLOR ENTRIES

BITMAP — INDEX TO COLOR TABLE

PIXEL 1 = COLOR 176
 PIXEL 2 = COLOR 2
 PIXEL 3 = COLOR 225
 PIXEL 4 = COLOR 23
  ⋮
 PIXEL m x n = COLOR X

INDEXING EXAMPLE

*fig. 9A*

DIRECT COLOR m x n REGION
MEMORY ORGANIZATION

CONTROL HEADER
   −LINK ADDRESS
   −SCREEN COORDINATES
   −BLEND VALUE
   −REGION SIZE
   −...etc

BITMAP − DIRECT COLOR DESCRIPTIONS

PIXEL 1 = COLOR DESCRIPTION (BLUE)
PIXEL 2 = COLOR DESCRIPTION (DARK BLUE)
PIXEL 3 = COLOR DESCRIPTION (GREEN)
PIXEL 4 = COLOR DESCRIPTION (RED)

⋮

PIXEL m x n = COLOR DESCRIPTION X

*fig. 9B*

COLOR MAPPED AND DIRECT COLOR OSD REGION PROCESSOR WITH SUPPORT FOR 4:2:2 PROFILE DECODE FUNCTION

TECHNICAL FIELD

The present invention is directed generally to digital video signal processing, and more particularly, to an on-screen display (OSD) processor having a color mapped mode, direct color mode, and 4:2:2 profile mode. The processor implements both color mapped OSD region processing capability and direct color OSD region processing capability, along with an ability to store quantizer coefficients for the 4:2:2 profile mode of a video decoder coupled to the OSD processor.

BACKGROUND OF THE INVENTION

The MPEG-2 standard describes an encoding method that results in substantial bandwidth reduction by a subjective lossy compression followed by a lossless compression. The encoded, compressed digital data is subsequently decompressed and decoded in an MPEG-2 compliant decoder. Video decoding in accordance with the MPEG-2 standard is described in detail in commonly assigned U.S. Letters Pat. No. 5,576,765, entitled "Video Decoder", which is hereby incorporated herein by reference in its entirety.

MPEG-2 video decoder/display chips are typically designed with a secondary display processor used for creating an overlay on the display. The source for the overlay image is coded overlay data that resides in the same memory that holds the MPEG video references frames, input buffer, and user data storage. This secondary video, known in the industry as the on-screen display (OSD), is often used by a digital video system to convey information to a viewer such as television program schedules, viewing guide information, recording lists, headline news, sporting results, operational details, etc. When a customer is not viewing a full screen video program, the customer is probably interfacing with one of the OSD functions listed above.

Besides program video and audio quality, the OSD functions play a major part in a viewer's perception of the overall quality of a digital video system. Thus, significant attention is given in the industry to the design and capabilities of the OSD features. This invention provides further enhancements to the conventional OSD processor and OSD features in order to establish commercial advantage of a digital video system employing the same.

DISCLOSURE OF THE INVENTION

Briefly summarized, this invention comprises in one aspect a digital video system comprising a display screen having a first overlay region and a second overlay region. The first overlay region of the display screen comprises a color mapped, on-screen display region and the second overlay region comprises a direct color OSD region. Preferably, the color mapped, OSD region and the direct color OSD region are produced by an OSD processor using an embedded memory which is shared by the regions.

In another aspect, the invention comprises an on-screen display (OSD) processor for processing OSD data of a digital video decode system. The OSD processor includes an embedded memory, write logic and read logic. The write logic writes color table data to the embedded memory when the OSD data comprises a color mapped mode and writes direct color bitmap data to the embedded memory when the OSD data comprises a direct color mode. The read logic reads color table data from the embedded memory for display when the OSD data is in color mapped mode and reads direct color bitmap data from the embedded memory for display when the OSD data comprises direct color mode. Thus, the embedded memory is alternately shared between OSD data in color mapped mode and OSD data in direct color mode, thereby allowing the OSD processor to provide both color mapped overlay regions and direct color overlay regions using the embedded memory.

In a further aspect, an on-screen display (OSD) processor is presented for processing OSD data of a digital video decode system having a video decoder. The OSD processor includes an embedded memory, and logic for employing the embedded memory during an OSD function of the digital video decode system. The OSD processor further includes logic for alternately employing the embedded memory during a 4:2:2 profile function of the video decoder when an image being decoded is in 4:2:2 format.

In yet another aspect, an on-screen display (OSD) processor is presented for processing OSD data of a digital video decode system. The OSD processor includes an embedded memory, write logic and read logic. The write logic writes direct color bitmap data into the embedded memory when the OSD data comprises a direct color description mode, while the read logic reads the direct color bitmap data from the embedded memory to an output of the OSD processor for display.

Processing methods and articles of manufacture encompassing the techniques of the above-outlined structures are also described and claimed herein.

To restate, an OSD processor is provided herein for a digital video decode system. This OSD processor has certain enhanced OSD capabilities. For example, provision is made for both color mapped and direct color capability so that both color mapped overlay regions and direct color overlay regions can be provided over a common display frame of an associated display of the digital video decode system. The OSD system includes logical implementation to store both color mapped and direct color data format in an embedded memory. This OSD bitmap data is processed and blended with decoded data to produce pixel data at the output of the decode system consisting of video data with overlayed graphics. Included within the direct color mode are features for selecting 4:2:0 or 4:2:2 bitmap format, as well as for activating pixel-by-pixel blending capabilities.

As part of the MPEG-2 syntax, an extra set of tables can be transmitted within the MPEG-2 stream prior to the reception of an actual 4:2:2 coded image. Pursuant to this invention, these "quantization matrix" tables are preferably stored in the OSD processor in a fashion similar to the storage of OSD colors. A unique feature of this design is thus to offer both the OSD functions, with provision for both mapped and direct color capability, and the 4:2:2 profile functions on a single chip, with the embedded memory structure required for both functions shared within the single device. The nature of the embedded memory is that it will only be used by one of the functions at any given time. Thus, three distinct uses for the OSD hardware are provided. The addition of the direct color OSD region processing capability along with the ability to store inverse quantizer coefficient data in conventional OSD hardware provides an economic and compact design as a whole, reducing the ultimate chip size of the MPEG decoder, while offering many options at a reasonable cost.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which:

FIG. 5 shows the position of luminance and chrominance signals in 4:2:0 format;

FIG. 6 shows the position of luminance and chrominance signals in 4:2:2 format;

FIG. 9a depicts memory organization for a color mapped m×n region;

FIG. 9b depicts memory organization for a direct color m×n region in accordance with the present invention;

BEST MODE FOR CARRYING OUT THE INVENTION

As the present invention may be applied in connection with an MPEG-2 decoder, in order to facilitate an understanding of the invention, some basic aspects of the MPEG-2 compression algorithm are first reviewed. It is to be noted, however, that the invention can also be applied to other video coding algorithms which share some of the features of the MPEG-2 algorithm.

To begin with, it will be understood that the compression of a data object, such as a page of text, an image, a segment of speech, or a video sequence, can be thought of as a series of steps, including: 1) a decomposition of that object into a collection of tokens; 2) the representation of those tokens by binary strings which have minimal length in some sense; and 3) the concatenation of the strings in a well-defined order. Steps 2 and 3 are lossless, i.e., the original data is faithfully recoverable upon reversal, and Step 2 is known as entropy coding. Step 1 can be either lossless or lossy in general. Most video compression algorithms are lossy because of stringent bit-rate requirements. A successful lossy compression algorithm eliminates redundant and irrelevant information, allowing relatively large errors where they are not likely to be visually significant and carefully representing aspects of a sequence to which the human observer is very sensitive. The techniques employed in the MPEG-2 algorithm for Step 1 can be described as predictive/interpolative motion-compensated hybrid DCT/DPCM coding. Huffman coding, also known as variable length coding, is used in Step 2.

The MPEG-2 video standard specifies a coded representation of video for transmission as set forth in ISO-IEC JTC1/SC29/WG11, Generic Coding of Moving Pictures and Associated Audio Information: Video, International Standard, 1994. The algorithm is designed to operate on interlaced or non-interlaced component video. Each picture has three components: luminance (Y), red color difference (Cr), and blue color difference (Cb). The video data may be coded in 4:4:4 format, in which case there is one Cr and one Cb sample for each Y sample, in 4:2:2 format, in which case there are half as many Cr and Cb samples as luminance samples in the horizontal direction, or in 4:2:0 format, in which case there are half as many Cr and Cb samples as luminance samples in both the horizontal and vertical directions.

Figure 1:
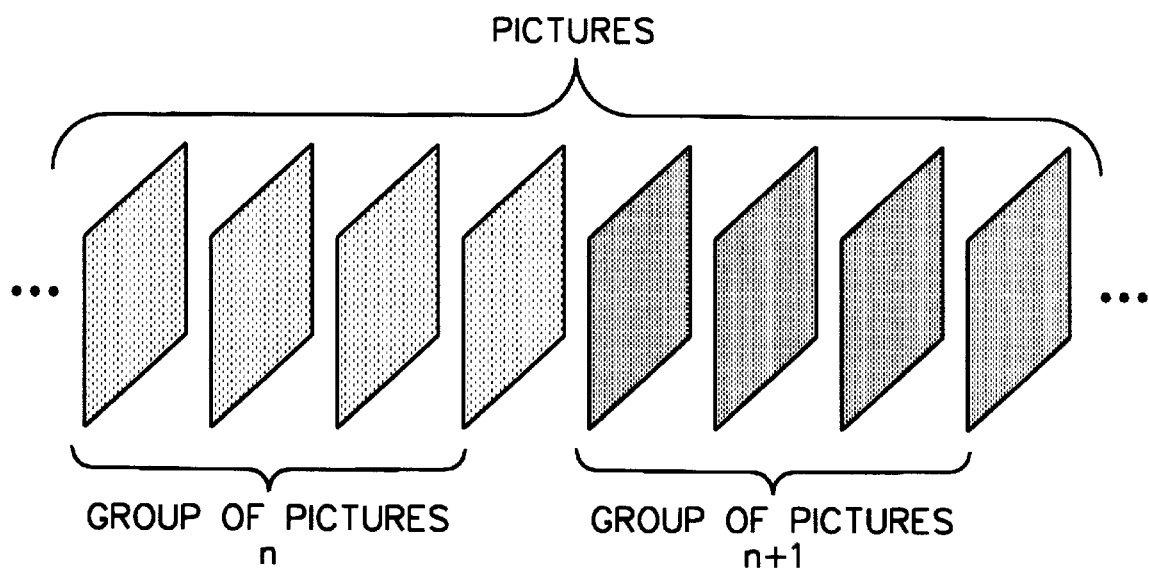
FIG. 1 shows an exemplary pair of groups of pictures (GOPs)
Figure 2:
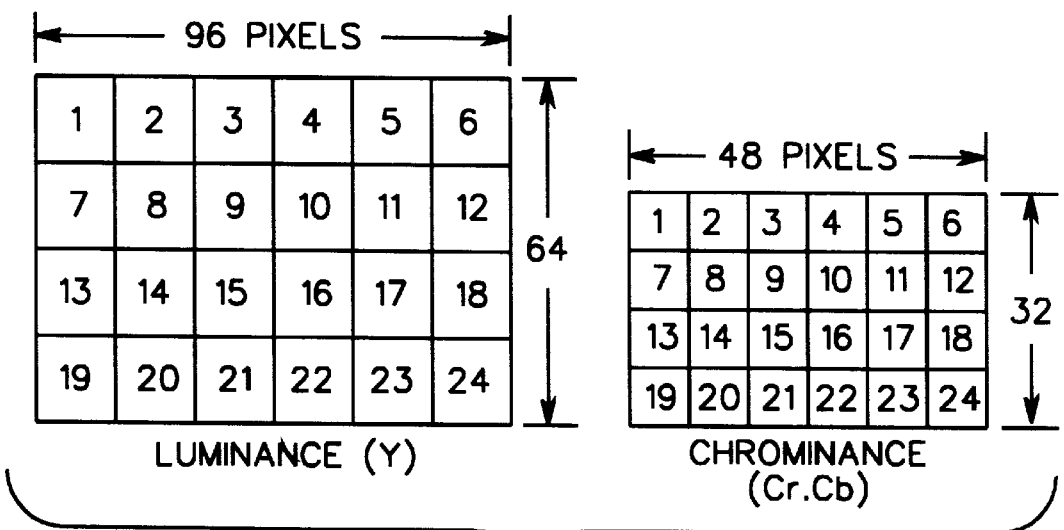
FIG. 2 shows an exemplary macroblock (MB) subdivision of a picture (4:2:0 format)

An MPEG-2 data stream consists of a video stream and an audio stream which are packed, together with systems information and possibly other bitstreams, into a systems data stream that can be regarded as layered. Within the video layer of the MPEG-2 data stream, the compressed data is further layered. A description of the organization of the layers will aid in understanding the invention. These layers of the MPEG-2 Video Layered Structure are shown in FIGS. 1 & 2. The layers pertain to the operation of the compression algorithm as well as the composition of a compressed bit stream. The highest layer is the Video Sequence Layer, containing control information and parameters for the entire sequence. At the next layer, a sequence is subdivided into sets of consecutive pictures, each known as a "Group of Pictures" (GOP). A general illustration of this layer is shown in FIG. 1. Decoding may begin at the start of any GOP, essentially independent of the preceding GOPs. There is no limit to the number of pictures which may be in a GOP, nor do there have to be equal numbers of pictures in all GOPs.

The third or Picture layer is a single picture. A general illustration of this layer is shown in FIG. 2. The luminance component of each picture is subdivided into 16×16 regions; the color difference components are subdivided into appropriately sized blocks spatially co-sited with the 16×16 luminance regions; for 4:4:4 video, the color difference components are 16×16, for 4:2:2 video, the color difference components are 8×16, and for 4:2:0 video, the color difference components are 8×8. Taken together, these co-sited luminance region and color difference regions make up the fifth layer, known as a "macroblock" (MB). Macroblocks in a picture are numbered consecutively in lexicographic order, starting with Macroblock 1.

Between the Picture and MB layers is the fourth or "slice" layer. Each slice consists of some number of consecutive MB's. Finally, each MB consists of four 8×8 luminance blocks and 8, 4, or 2 (for 4:4:4 , 4:2:2 and 4:2:0 video) chrominance blocks. The Sequence, GOP, Picture, and slice layers all have headers associated with them. The headers begin with byte-aligned Start Codes and contain information pertinent to the data contained in the corresponding layer.

A picture can be either field-structured or frame-structured. A frame-structured picture contains information to reconstruct an entire frame, i.e., the combination of one field containing the odd lines and the other field containing the even lines. A field-structured picture contains information to reconstruct one field. If the width of each luminance frame (in picture elements or pixels) is denoted as C and the height as R (C is for columns, R is for rows), a field-structured picture contains information for C×R/2 pixels.

The two fields in a frame are the top field and the bottom field. If we number the lines in a frame starting from 1, then the top field contains the odd lines (1, 3, 5, . . . ) and the bottom field contains the even lines (2, 4, 6, . . . ). Thus we may also call the top field the odd field, and the bottom field the even field.

A macroblock in a field-structured picture contains a 16×16 pixel segment from a single field. A macroblock in a frame-structured picture contains a 16×16 pixel segment from the frame that both fields compose; each macroblock contains a 16×8 region from each of the two fields.

Within a GOP, three types of pictures can appear. The distinguishing difference among the picture types is the compression method used. The first type, Intramode pictures or I-pictures, are compressed independently of any other picture. Although there is no fixed upper bound on the distance between I-pictures, it is expected that they will be interspersed frequently throughout a sequence to facilitate random access and other special modes of operation. Predictively motion-compensated pictures (P pictures) are reconstructed from the compressed data in that picture plus two reconstructed fields from previously displayed I or P pictures. Bidirectionally motion-compensated pictures (B pictures) are reconstructed from the compressed data in that picture plus two reconstructed fields from previously displayed I or P pictures and two reconstructed fields from I or P pictures that will be displayed in the future. Because reconstructed I or P pictures can be used to reconstruct other pictures, they are called reference pictures.

With the MPEG-2 standard, a frame can be coded either as a frame-structured picture or as two field-structured pictures. If a frame is coded as two field-structured pictures, then both fields can be coded as I pictures, the first field can be coded as an I picture and the second field as a P picture, both fields can be coded as P pictures, or both fields can be coded as B pictures.

A common compression technique is transform coding. In MPEG-2 and several other compression standards, the discrete cosine transform (DCT) is the transform of choice. The compression of an I-picture is achieved by the steps of 1) taking the DCT of blocks of pixels, 2) quantizing the DCT coefficients, and 3) Huffman coding the result. In MPEG-2, the DCT operation converts a block of n×n pixels into an n×n set of transform coefficients. Like several of the international compression standards, the MPEG-2 algorithm uses a DCT block size of 8×8. The DCT transformation by itself is a lossless operation, which can be inverted to within the precision of the computing device and the algorithm with which it is performed.

The second step, quantization of the DCT coefficients, is the primary source of lossiness in the MPEG-2 algorithm. Denoting the elements of the two-dimensional array of DCT coefficients by cmn, where m and n can range from 0 to 7, aside from truncation or rounding corrections, quantization is achieved by dividing each DCT coefficient cmn by wmn times QP, with wmn being a weighting factor and QP being the quantizer parameter. The weighting factor wmn allows coarser quantization to be applied to the less visually significant coefficients. The quantizer parameter QP is the primary means of trading off quality vs. bit-rate in MPEG-2. It is important to note that QP can vary from MB to MB within a picture.

Following quantization, the DCT coefficient information for each MB is organized and coded, using a set of Huffman codes. As the details of this step are not essential to an understanding of the invention and are generally understood in the art, no further description is needed here.

Most video sequences exhibit a high degree of correlation between consecutive pictures. A useful method to remove this redundancy prior to coding a picture is "motion compensation". MPEG-2 provides tools for several methods of motion compensation.

The methods of motion compensation have the following in common. For each macroblock, one or more motion vectors are encoded in the bit stream. These motion vectors allow the decoder to reconstruct a macroblock, called the predictive macroblock. The encoder subtracts the "predictive" macroblock from the macroblock to be encoded to form the "difference" macroblock. The encoder uses tools to compress the difference macroblock that are essentially similar to the tools used to compress an intra macroblock.

The type of a picture determines the methods of motion compensation that can be used. The encoder chooses from among these methods for each macroblock in the picture. If no motion compensation is used, the macroblock is intra (I). The encoder can make any macroblock intra. In a P or a B picture, forward (F) motion compensation can be used; in this case, the predictive macroblock is formed from data in the previous I or P frame. In a B picture, backward (B) motion compensation can also be used; in this case, the predictive macroblock is formed from data in the future I or P frame. In a B picture, forward/backward (FB) motion compensation can also be used; in this case, the predictive macroblock is formed from data in the previous I or P frame and the future I or P frame.

Because I and P pictures are used as references to reconstruct other pictures (B and P pictures) they are called reference pictures. Because two reference frames are needed to reconstruct B frames, MPEG-2 decoders typically store two decoded reference frames in memory.

Aside from the need to code side information relating to the MB mode used to code each MB and any motion vectors associated with that mode, the coding of motion-compensated macroblocks is very similar to that of intra-mode MBs. Although there is a small difference in the quantization, the model of division by wmn times QP still holds.

The MPEG-2 algorithm -can be used with fixed bit-rate transmission media. However, the number of bits in each picture will not be exactly constant, due to the different types of picture processing, as well as the inherent variation with time of the spatio-temporal complexity of the scene being coded. The MPEG-2 algorithm uses a buffer-based rate control strategy to put meaningful bounds on the variation allowed in the bit-rate. A Video Buffer Verifier (VBV) is devised in the form of a virtual buffer, whose sole task is to place bounds on the number of bits used to code each picture so that the overall bit-rate equals the target allocation and the short-term deviation from the target is bounded. This rate control scheme can be explained as follows. Consider a system consisting of a buffer followed by a hypothetical decoder. The buffer is filled at a constant bit-rate with compressed data in a bit stream from the storage medium. Both the buffer size and the bit-rate are parameters which are transmitted in the compressed bit stream. After an initial delay, which is also derived from information in the bit stream, the hypothetical decoder instantaneously removes from the buffer all of the data associated with the first picture. Thereafter, at intervals equal to the picture rate of the sequence, the decoder removes all data associated with the earliest picture in the buffer.

Figure 3:
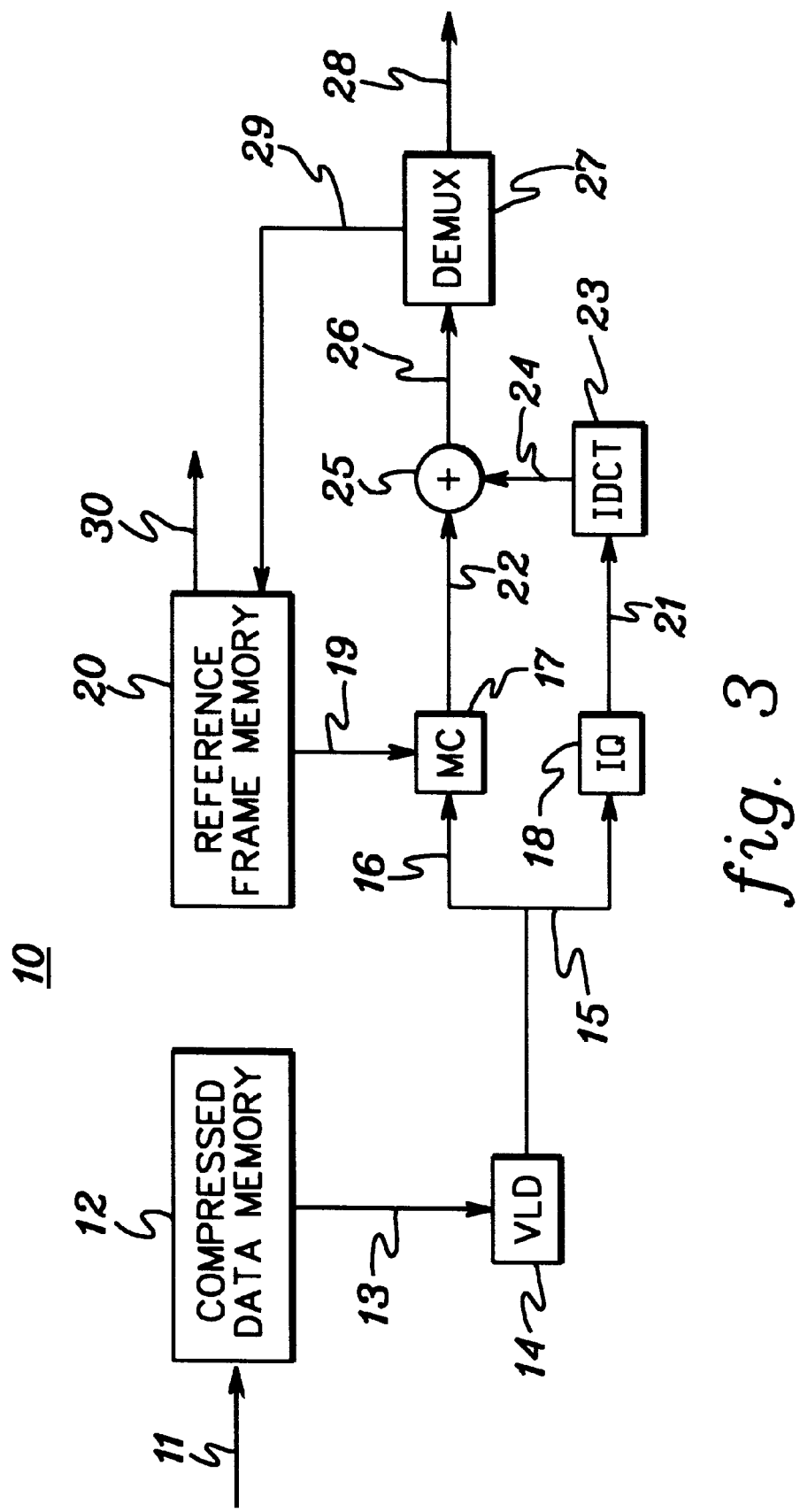
FIG. 3 depicts a block diagram of a video decoder.

FIG. 3 shows a diagram of a conventional video decoder. The compressed data enters as signal 11 and is stored in the compressed data memory 12. The variable length decoder (VLD) 14 reads the compressed data as signal 13 and sends motion compensation information as signal 16 to the motion compensation (MC) unit 17 and quantized coefficients as signal 15 to the inverse quantization (IQ) unit 18. The motion compensation unit reads the reference data from the reference frame memory 20 as signal 19 to form the predicted macroblock, which is sent as the signal 22 to the adder 25. The inverse quantization unit computes the unquantized coefficients, which are sent as signal 21 to the inverse transform (IDCT) unit 23. The inverse transform unit computes the reconstructed difference macroblock as the inverse transform of the unquantized coefficients. The reconstructed difference macroblock is sent as signal 24 to the adder 25, where it is added to the predicted macroblock. The adder 25 computes the reconstructed macroblock as the sum of the reconstructed difference macroblock and the predicted macroblock. The reconstructed macroblock is then sent as signal 26 to the demultiplexer 27, which stores the reconstructed macroblock as signal 29 to the reference memory if the macroblock comes from a reference picture or sends it out (to memory or display) as signal 28. Reference frames are sent out as signal 30 from the reference frame memory.

Figure 4:
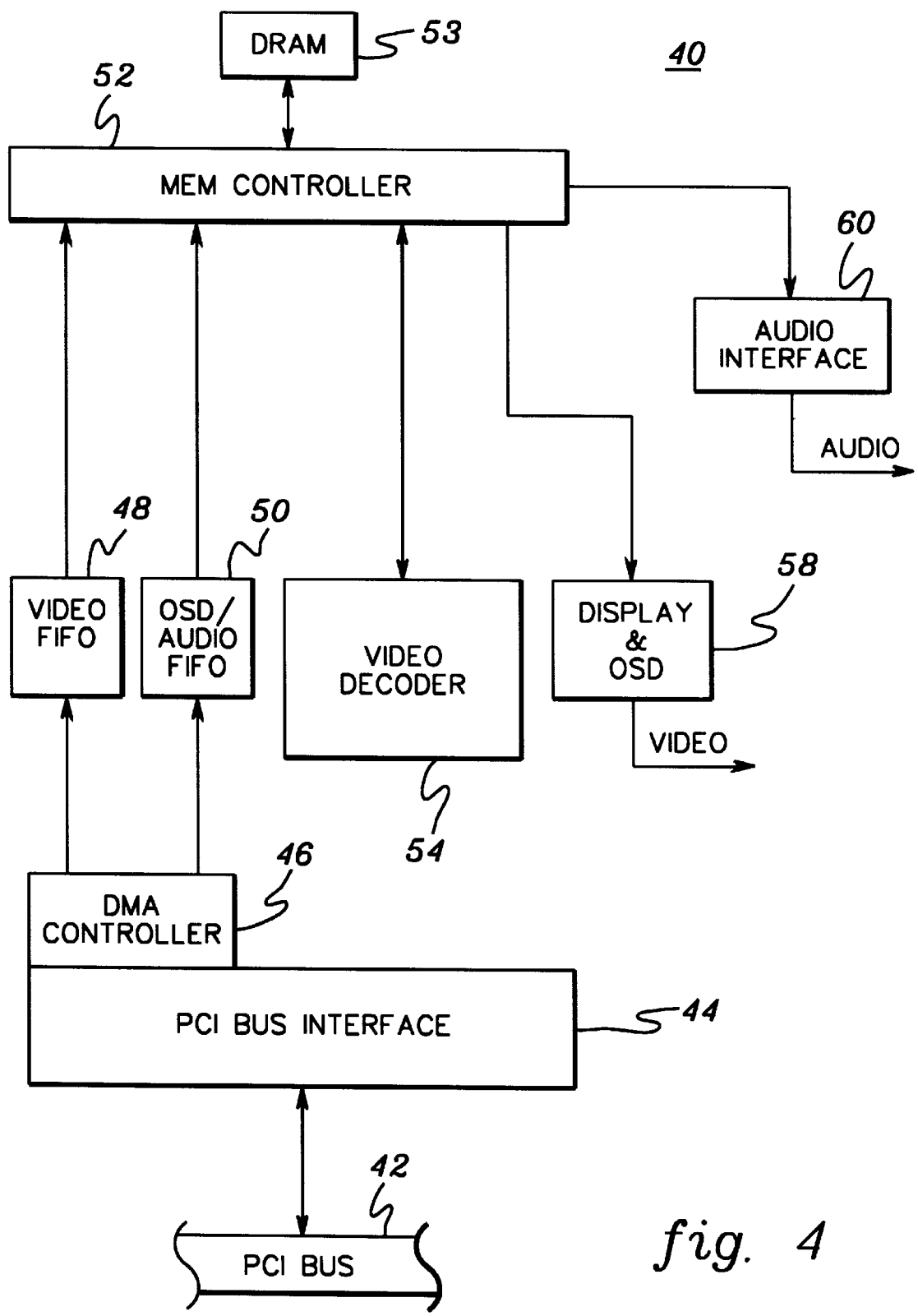
FIG. 4 is a block diagram of a video decoding system to employ the principles of the present invention.

A decode system, generally denoted 40, to employ the present invention is depicted in FIG. 4. System 40 might include a PCI bus interface 44 which couples the decode system 40 to a PCI bus 42. MPEG encoded video data is fetched from PCI bus 42 by a DMA controller 46 which writes the data to a video First-In/First-Out (FIFO) buffer 48. The DMA controller also fetches on-screen display and/or audio data from PCI bus 42 for writing to an OSD/audio FIFO 50. A memory controller 52 will place video data into a correct memory buffer within dynamic random access memory (DRAM) 53. As used herein, "DRAM" is intended to encompass synchronous dynamic random access memory as well. MPEG compressed video data is then retrieved by the video decoder 54 from DRAM 53 and decoded as described above in connection with FIG. 3. Conventionally, the decoded video data is then stored back into the frame buffers of DRAM 53 for subsequent use as already described. When a reference frame is needed, or when video data is to be output from the decode system, stored data in DRAM 53 is retrieved by the MEM controller and forwarded for output via a display & OSD interface 58. Audio data, also retrieved by the memory controller 52, is output through an audio interface 60.

More specifically, this invention relates to an enhanced OSD processor for the display & OSD unit of FIG. 4. An on-screen display system for an MPEG video decode system is disclosed that contains logical implementation to accommodate bitmap data alternately configured in color mapped and direct color formats. Overlay images to be displayed over MPEG video are stored in memory using one of these two different approaches: as "color mapped" image data or as "direct color" image data. Pursuant to the present invention, these two approaches are merged within a single OSD system. (Note that as used herein the term "direct color" means the actual color description data.) The approaches are described in detail below.

Because the overlay image resides in the same memory that holds MPEG video structures, small image size in memory is often desirable and the typical OSD design uses color mapped OSD data and processing of images. Color mapped storage of OSD images in memory is a reduced coding that allows use of only 2, 4, or sometimes 8 bits to describe both the luminance and chrominance of each pixel within an OSD region. As used herein, the phrase "color mapped OSD data" or "color mapped OSD region" thus refers to an overlay region described and processed using a color mapping approach within the OSD system. The bitmap bits are organized into displayable blocks (OSD regions) that contain both the bitmap color information and a control information header. The bitmap bits address a color lookup table with either preset color information, or alterable information as the screen progresses. These OSD regions are placed in memory as separately addressable packets, with the packets organized in display order fashion. The header control bits are responsible for functions such as:

Link address. The link address creates a link from one OSD region to another. The links between the OSD regions are set up in display order fashion. As the display progresses down the screen raster, a new OSD region may be linked into action by the previous OSD region.

Screen coordinates. Screen coordinates control the position of where the block of bitmapped pixels will appear on the display.

Color table. The color table assigns color values (Y, Cr and Cb) to specific patterns coded for each pixel in the bitmap. Usually one of the many combinations for Y, Cr and Cb is reserved with a special meaning. When the special Y, Cr and Cb pattern is selected from the color table by the bitmapped pixel, the "color" is understood to be transparent. A transparent "color" is one where the underlying video is allowed to show through the OSD overlay. Sometimes, a control is set in the OSD region header to regulate the ratio of video to OSD.

Blending control. This controls the mix ratio of the blending of an OSD image with the program video to give a "see-through" affect.

Recent trends in the offered capabilities of the OSD function include a greatly increased color capability, where up to 256 colors may be rendered in a single OSD region. The use of more color allows a programmer to produce more life-like overlay images on the video screen, images of quality comparable to the MPEG-2 decoded video that the OSD is overlaying. However, this quality comes at a high price to the VLSI design in layout parameters. In order to allow the programmer to be able to fully utilize the 256 color capability without imposing any restrictions on the relative position of the colors or the rate at which the designer would be allowed to use new colors within the OSD image, it is necessary to store the descriptions of the 256 colors in an embedded memory array. This memory array must therefore be of the size and capability to be able to hold full 256 color descriptions that will be used during the look-up process for the incoming bitmap. Compared to embedded memories used for color storage of previous designs using a maximum of 16 colors, this embedded memory requires a very large space on silicon. Given that the MPEG-2 video decoder/display chip market continues to become increasingly competitive, this extra chip space can be a burden to the overall cost of the device.

The main video format used for a set-top-box application, where the above-described OSD application will find its greatest use, is known in the industry as 4:2:0 format. Detailed information on 4:2:0 format can be obtained from the MPEG-2 Standard, ISO/IEC 13818-2. Briefly, when the original image is decoded, it may be sub-sampled in several ways in order to reduce the space that the image will require for storage, two of which include simple decimation, and another by means of a digital filter. This implies a certain spatial locality of the reduced luminance and chrominance samples with respect to the original samples. When this image is post-processed by the display function during the eventual expansion back to the original size, the spatial relationship must be reconstructed as closely as possible.

The chrominance difference signals are usually sub-sampled from the original image prior to MPEG-2 encoding. The chrominance sampling format is specified according to the following:

4:2:0 Chrominance difference signals are sub-sampled in one-half the resolution of the luminance in both the vertical dimension a nd horizontal dimension.

4:2:2 Chrominance difference samples are sub-sampled in one-half the resolution of the luminance in the horizontal dimension only.

4:4:4 There is an equal number of luminance samples and chrominance difference samples.

For MPEG-2 main level, main profile, the compressed data consists of 4:2:0 chrominance. Most MPEG-2 decoders output the uncompressed video in 4:2:2 format. The 4:2:0 and 4:2:2 formats are represented in FIG. 5 and FIG. 6, respectively. As shown, the horizontal position of the chrominance samples is co-located with the luminance samples for MPEG-2 4:2:2 format. A co-located sample is made by taking the same number of samples of chrominance as luminance pixels, but then decimating every other sample.

As a distinctly separate market to the one described above for MPEG-2 video decoder/display chips, 4:2:2 video offers a higher quality image, and may be used as the video source of choice when a higher quality video is required. As a subset of the MPEG-2 specification, there exists a 4:2:2 profile description that covers this coding syntax. As part of the 4:2:2 profile, an extra set of tables is transmitted within the MPEG-2 stream just prior to the reception of the actual 4:2:2 coded image. These "quantization matrix" tables are used in the decoding of both intra and non-intra material in such a way that the tables must be stored in an embedded memory in a similar fashion to the storage of the OSD data described above. The size of the embedded memory for this 4:2:2 function has in the past made it undesirable to include this function with the rest of the 4:2:0 functions where OSD capability is pre-existing. In one aspect, therefore, the present invention comprises logic for accommodating these quantization matrix tables within the OSD system as a means of utilizing structures existing in accordance with the present invention.

Figure 7:
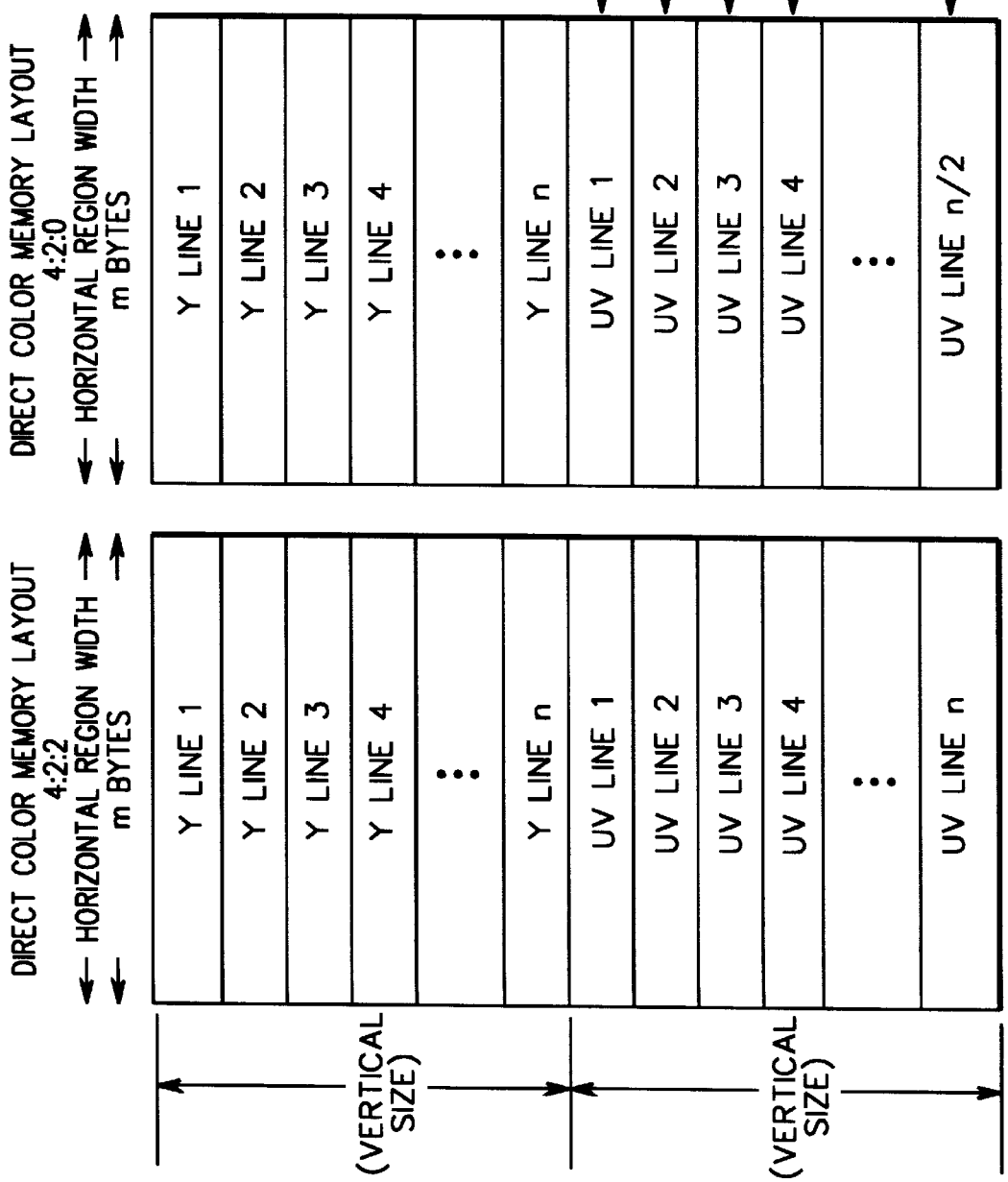
FIG. 7 depicts direct color memory layout for OSD data in 4:2:2 format and direct color memory layout for OSD data in 4:2:0 format.

Returning to the overlay processing options noted above, one aspect of the present invention is the creation of OSD processor logic which allows "direct color" imaging as well as "color mapped" imaging. An alternative to storing OSD regions in memory as standard color mapped bitmap is to use direct color coding in accordance with this invention. As used herein, "direct color" means the actual color descriptors for a pixel, i.e., the luminance and chrominance values to be used in the overlay. Direct color coding allows an OSD image to process the same level of color depth as that of decoded MPEG video data. Rather than the bitmap data being addresses to a color lookup table as in a color mapped implementation, data is simply stored in memory as the actual luminance and chrominance information. To be compatible with the video that is sent with a width of 16 bits per pixel, the 16 bits for each pixel are preferably divided into a luminance component (8 bits) and a chrominance component (8 bits). Luminance data and chrominance data are separated and stored in separate but consecutive regions of memory, exactly in the way 4:2:2 or 4:2:0 video image data is stored (e.g., reference U.S. Pat. No. 5,668,599, entitled "Memory Management For An MPEG-2 Compliant Decoder"). The standard memory layout for both video and OSD images stored in 4:2:2 and 4:2:0 format is shown in FIG. 7. As can be seen from FIG. 7, 4:2:0 is a vertically decimated version of 4:2:2 video, where to reduce the amount of data involved one chrominance line is played twice during the display of two successive luminance lines. The implementation of processing 4:2:0 regions is thus desirable because of the limited space in memory typically available for OSD regions.

To summarize, two possible methods of storing OSD region data are color mapped and direct color. Color mapped image data consists of addresses to luminance and chrominance data to be blended with the luminance and chrominance components of video pixels. Direct color image data consists of luminance and chrominance components that can be directly blended themselves with the luminance and chrominance components of the video pixel. The fetching and displaying of an image coded in direct color is significantly different than the process used to fetch and display a color mapped image.

In accordance with the present invention, however, the OSD programmer may code different regions of a screen (or common display frame) in either color mapped or direct color format. The programmer can achieve video quality overlays with direct color regions and still conserve memory space with other regions of lower resolution within the same OSD picture frame.

No significant additional hardware is needed to add direct color region processing capabilities to a commercially available OSD color mapped region processor. Once the region mode (direct color or color mapped) has been decoded from the region header (described below), the hardware is free to be utilized completely with color mapped or direct color functionality until the end of the region is displayed and a new region header is loaded. This results in an efficient use of the OSD hardware.

Figure 8:
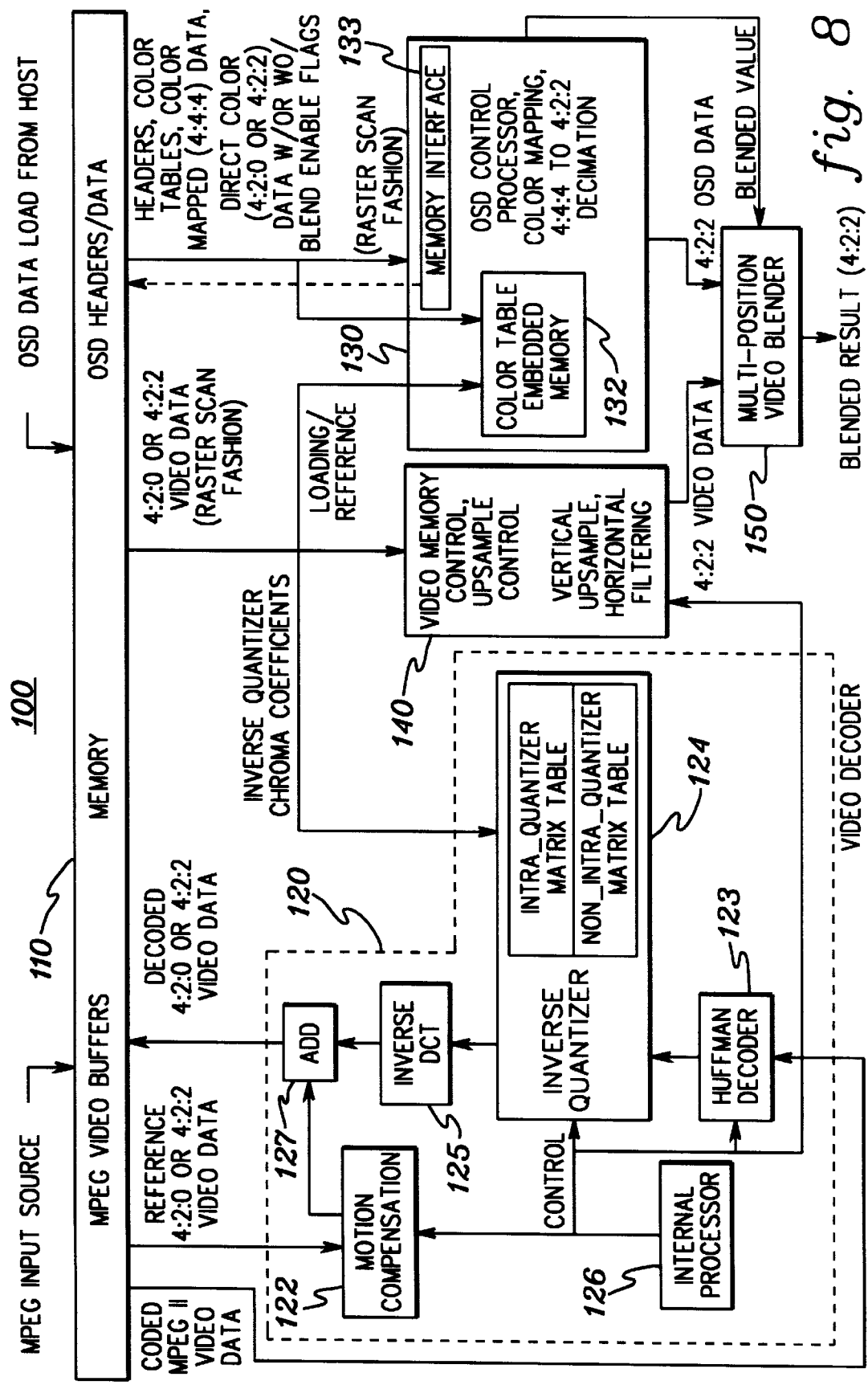
FIG. 8 depicts a more detailed embodiment of a digital video decode system in accordance with the principles of the present invention.

FIG. 8 presents one embodiment of a video decoder/OSD system in accordance with the principles of the present invention. This system 100 includes memory 110, such as SDRAM or DRAM, a video decoder 120, and an OSD control processor 130. In operation, encoded MPEG input is received into MPEG video buffers within memory 110. This video input can be in 4:2:0 or 4:2:2 video format. From the input, reference data is forwarded to a motion compensation unit 122 of video decoder 120 and coded MPEG-2 video data is forwarded to a Huffman decoder 123. Output from the variable length decoder 123 is forwarded to an inverse quantizer 124, which employs an Intra_Quantizer Matrix Table and a Non_Intra_Quantizer Matrix Table. The inverse quantizer computes the unquantized coefficients and forwards the coefficients to an inverse transform (IDCT) unit 125. An internal processor 126 coordinates the decode operation of motion compensation 122, Huffman decoder 123 and inverse quantizer 124. The inverse transformation unit computes the reconstructed difference macroblock as the inverse transform of the unquantized coefficients. The reconstructed difference macroblock is sent to an adder 127 where it is added to the predicted macroblock for motion compensation unit 122. The adder computes the reconstructed macroblock as the sum of the reconstructed difference macroblock and the predicted macroblock. The reconstructed macroblock is then sent to memory 110 as decoded 4:2:0 or 4:2:2 video data.

The decoded output written into memory 110 is retrieved in raster scan fashion by a video memory control/upsample control 140, which includes vertical upsample and horizontal filtering. Vertical upsample and horizontal filtering are described in detail in co-pending, commonly assigned U.S. patent application Ser. No. 09/015,463, entitled "Multi-Format Reduced Memory Video Decoder With Adjustable Polyphase Expansion Filter," the entirety of which is hereby incorporated herein by reference. Output from video memory control 140 is a 4:2:2 video data signal which is forwarded to a multi-position video blender 150 to produce a blended result of 4:2:2 video data. During this processing, any video data in 4:2:0 format is converted to 4:2:2 video data format, i.e., chrominance data is upsampled to match a 4:2:2 result.

Memory 110 also accommodates OSD headers/data loaded from a host processor. The host processor can comprise any source closer to the end user of the digital video system. Commensurate with retrieval of the decoded data in raster scan fashion, OSD control processor 130 is retrieving OSD data from memory. This OSD data comprises headers, color tables, color mapped (4:4:4) data, direct color (4:2:0 or 4:2:2) data with or without blend enable flags, also in raster scan fashion. This data is passed through a memory interface 133 for processing by the OSD control processor, described in detail below with reference to FIGS. 11a, 11b & 11c. The OSD control processor converts color map data from memory and will do the actual mapping of the color addresses to the colors for every pixel. If in direct color mode, then the bitmaps equal the direct color values and the video data is more similar to that flowing through the video memory control 140.

Output from OSD control processor 130 comprises 4:2:2 OSD data, which is also forwarded to multi-position video blender 150. As noted, logic 150 produces the blended result in 4:2:2 format. Blend enable flags, comprising tags embedded within the OSD data stored into memory by the host processor, are forwarded by the OSD control processor to blender 150 as blend values. These blend values are used to control the final mixing stage of the video and OSD material.

FIGS. 9a & 9b depict memory organization for a color mapped region and a direct color region, respectively, to be implemented in accordance with the present invention. Beginning with FIG. 9a, a control header is shown to comprise multiple fields, including a link address field, screen coordinates field, blend value field, region size field, and resolution control field, etc. Note that an OSD processor in accordance with the present invention would have link list capabilities, however, those capabilities are not directly relevant to the invention disclosed herein. One field in the control header of the color mapped region which is absent from the control header of the direct color region shown in FIG. 9b, is the pixel resolution control field. The pixel resolution control is an indicator for the type of color that is to be described. What is the duration of the color, i.e., is it one or two pixels? In the direct color control header, there is no need for a similar concept as pixel pairing, therefore this particular bit field is used for something else.

The color mapped region also includes a color table comprising up to 256 color description entries and a bitmap region which comprises an index into the color table. The color table is implemented within the OSD processor within an embedded memory described further herein.

Referring to FIG. 9b, the direct color region includes control header information similar to that for the color mapped region, again absent a resolution control field. The remaining memory organization for the direct color region comprises a bitmap which consists of direct color descriptions. These color descriptions are preferably loaded directly into the above-noted embedded memory of the OSD processor.

As noted, the present invention combines the ability to process color mapped images with the ability to process direct color images in part by altering state machines and control logic used for color mapped images so that direct color images may be processed as well. A single OSD controller is preferably used to fetch OSD region headers, traversing the linked list of regions as the screen progresses with no prior information as to whether the next region is to be processed as a direct color or a color mapped image. The particular region to be processed next will be defined by the fields of the control header.

As mentioned, in processing a direct color region, pixel pair processing is unused so the header bit controlling pixel resolution in color mapped mode can be used in direct color mode to switch between processing an image stored in 4:2:2 format or 4:2:0 format. Thus, after a region is determined to be a direct color region, the OSD controller determines whether the following image data is stored in 4:2:2 or 4:2:0 format in memory with another header control bit. The header bit used when in direct color mode to switch between 4:2:2 and 4:2:0 image processing can be the same bit that is used to determine the pixel resolution of color mapped images. Direct color pixel data is always displayed for the duration of one pixel so the pixel resolution may be more efficiently used as a switch signal between 4:2:2 and 4:2:0 image processing.

Creation of direct color OSD regions by the programmer is convenient and can be done relatively quickly from a wealth of sources. One approach would be decoded MPEG video data itself since decoded MPEG video data is stored in 4:2:2 or 4:2:0 format awaiting display. Capturing a video frame, or a portion of a frame and creating an OSD region from the decoded video data stored in memory would require little or no manipulation of the video frame data, only the creation of the header itself. Decimating this video frame data to produce a corresponding reduced size OSD region could be done in a manner similar to that currently used to implement reduced size video playback.

For processing a color mapped region, there also is typically a bit in the header to control whether the region needs to have a color table loaded or whether it may use a common color table previously loaded for sharing by multiple regions. In direct color mode, this bit has no use since direct color image data does not reference a color table. Thus, in one implementation of the present invention, this bit can be used in direct color mode to switch between two possible data formats applicable only to direct color:

1. The storage in memory of each pixel consists of two components: 8 bits of luminance and 8 bits of chrominance.
2. The storage in memory of each pixel consists of three components: 8 bits of luminance, 7 bits of chrominance, and 1 blend enable bit to allow the pixel to be blended with the MPEG-2 video using region blending control values.

It is standard practice when building a color table for color mapped regions to include three components for each color table entry: a luminance component, a chrominance component, and blend control bit or bits. The blending control enables that particular color to be blended with MPEG-2 decoded video data whenever that table entry is addressed. Otherwise, if the blending is disabled for that particular color table entry, the OSD color displayed will not blend with the video pixel but rather cover it. This is typical OSD/video blending on a color basis. Both color mapped blending and direct color blending is typically further controlled by OSD/video blend ratios configured by the programmer on a region-by-region basis.

In direct color mode, OSD/video blending can be done if the bitmap data is stored in format number 2 above. This approach to blending is significantly different than blending on a color basis. Rather, each individual pixel has a blend enable bit stored in the same byte as the chrominance component, e.g., as a least significant bit of that byte of the pixel, resulting in blending on a pixel basis. Blending on a pixel basis offers the unique advantage of being able to blend only certain parts of a region. For example, two pixels of identical color could be located in two separate parts of a given region with one pixel being blended and the other pixel being not blended with video. This would be difficult when using the standard blending on a color basis since the pixel data for both pixels would likely come from the exact same color table entry. It might be possible to code the same color in the color table twice, once with blending enabled, and once with blending disabled, but this would become inefficient when trying to create a non-trivial OSD presentation.

Figure 10:
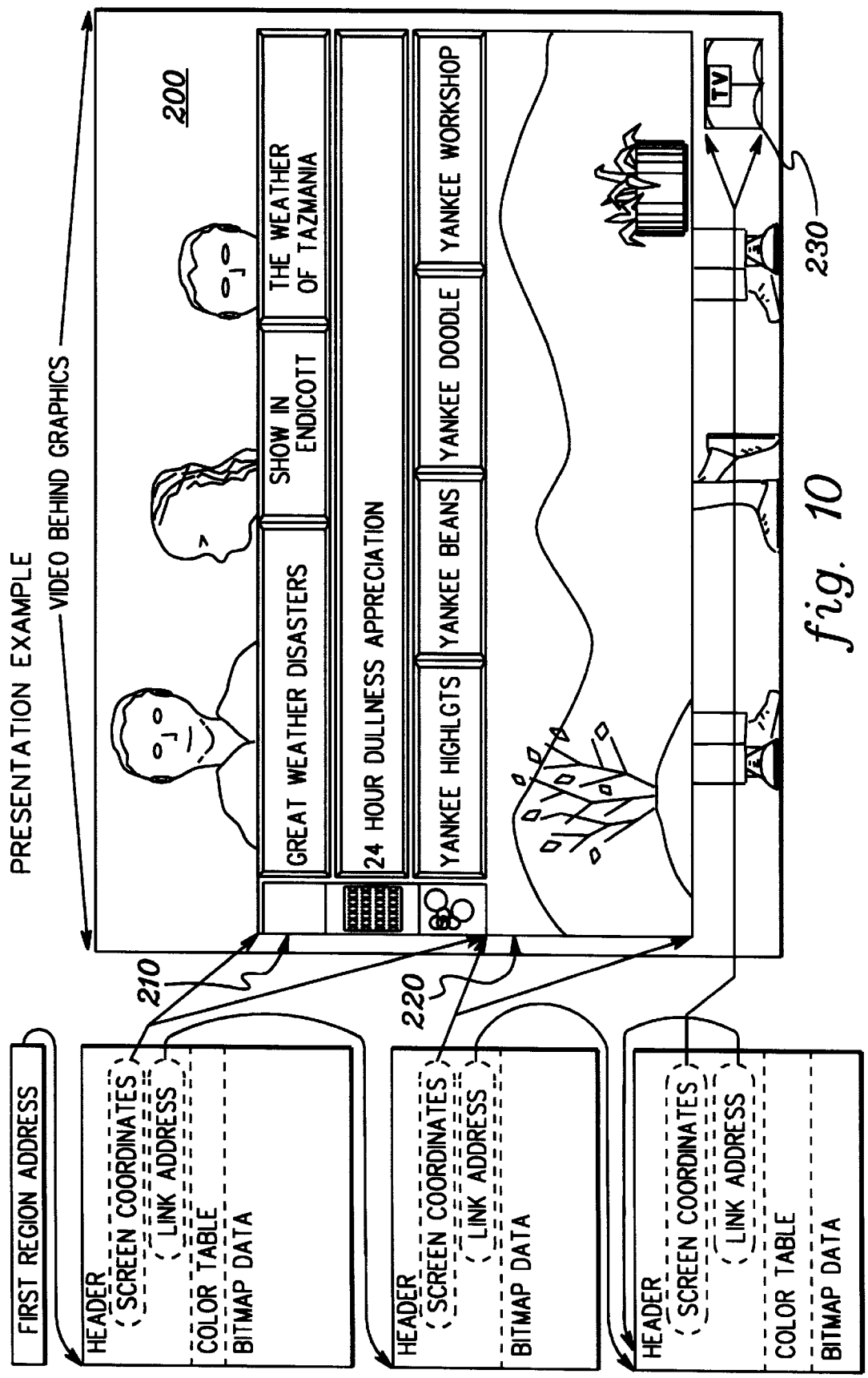
FIG. 10 depicts an OSD presentation example in accordance with the principles of the present invention.

FIG. 10 depicts one overlay presentation example in accordance with the present invention. This presentation example includes conventional digital video display 200 on a display screen. Overlying display 200 are one or more OSD regions. In this example, a first region comprises a color mapped region 210 with 256 color resolution. A second region comprises a direct color region 220 while a third region comprises a second color map region 230, again with 256 color resolution. The OSD control processor initiates processing of the first region 210 via a first region address. Screen coordinate and link address fields are employed to determine the size of this first region and to link the OSD processor to the second region 220.

As noted above, another unique feature to an OSD processor in accordance with the present invention is the ability to offer both the OSD function with 256 color capability, and the 4:2:2 profile function on a single chip, with the embedded memory structure required for both functions being shared within the single device. This is shown in FIG. 8. The nature of the embedded memory is that it will be used by only one of the functions for any given application.

For set-top-box applications, the embedded memory space is assumed to be available by the OSD programmer, and the programmer loads and uses it without any knowledge of the shared memory. For the high quality 4:2:2 profile applications, there is no need for the OSD functions, so the decoding of 4:2:2 images may also proceed without any knowledge of the shared memory. In this case, the quantization matrix tables that are used in the decoding of both intra and non-intra material are stored in the OSD color table embedded memory. The quantization matrix only utilizes the first 8 bits of the 32 bit wide embedded memory, and the remaining 24 bits are left empty. The switch mechanism used to multiplex the two data types together is the presence of the "CHROMA_FORMAT" ="10", which is the code for 4:2:2. The CHROMA_FORMAT bits are received in an MPEG-2 video stream in the sequence extension header. Reference ISO/IEC 13818-2 of the International Standard for additional description of these bits.

Thus, for both applications, the chip user need not be aware that embedded memory of the OSD processor is shared with other functions since only one function at a time is using the buffer. Thus, the present invention provides the advantage of reducing manufacturing and development costs significantly by having to only inventory a single part which is able to expand upon the functions of the current art.

Figure 11A:
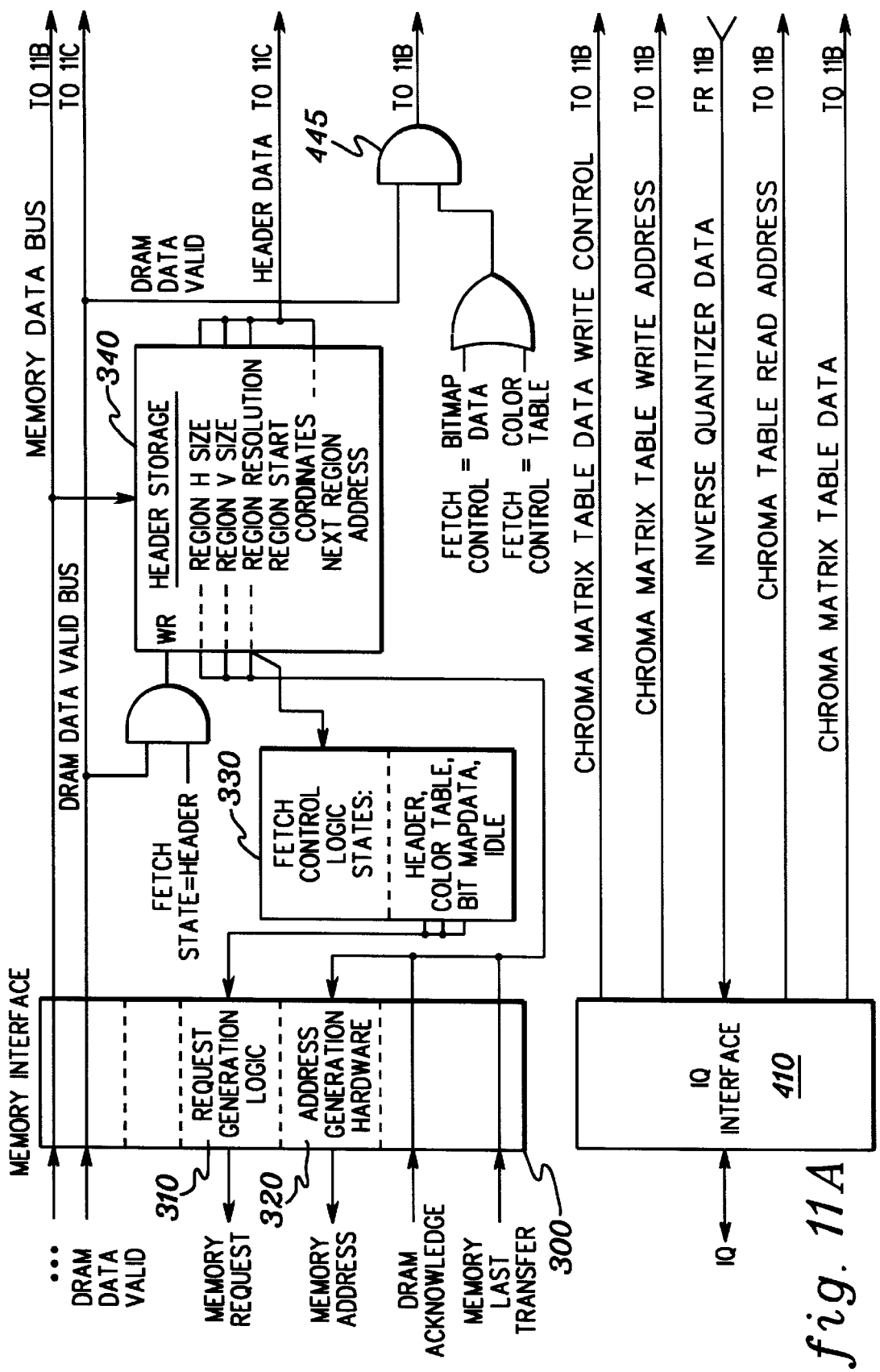
FIGS. 11a, 11b & 11c depict one detailed embodiment of an OSD processor implemented in accordance with the present invention.
Figure 11B:
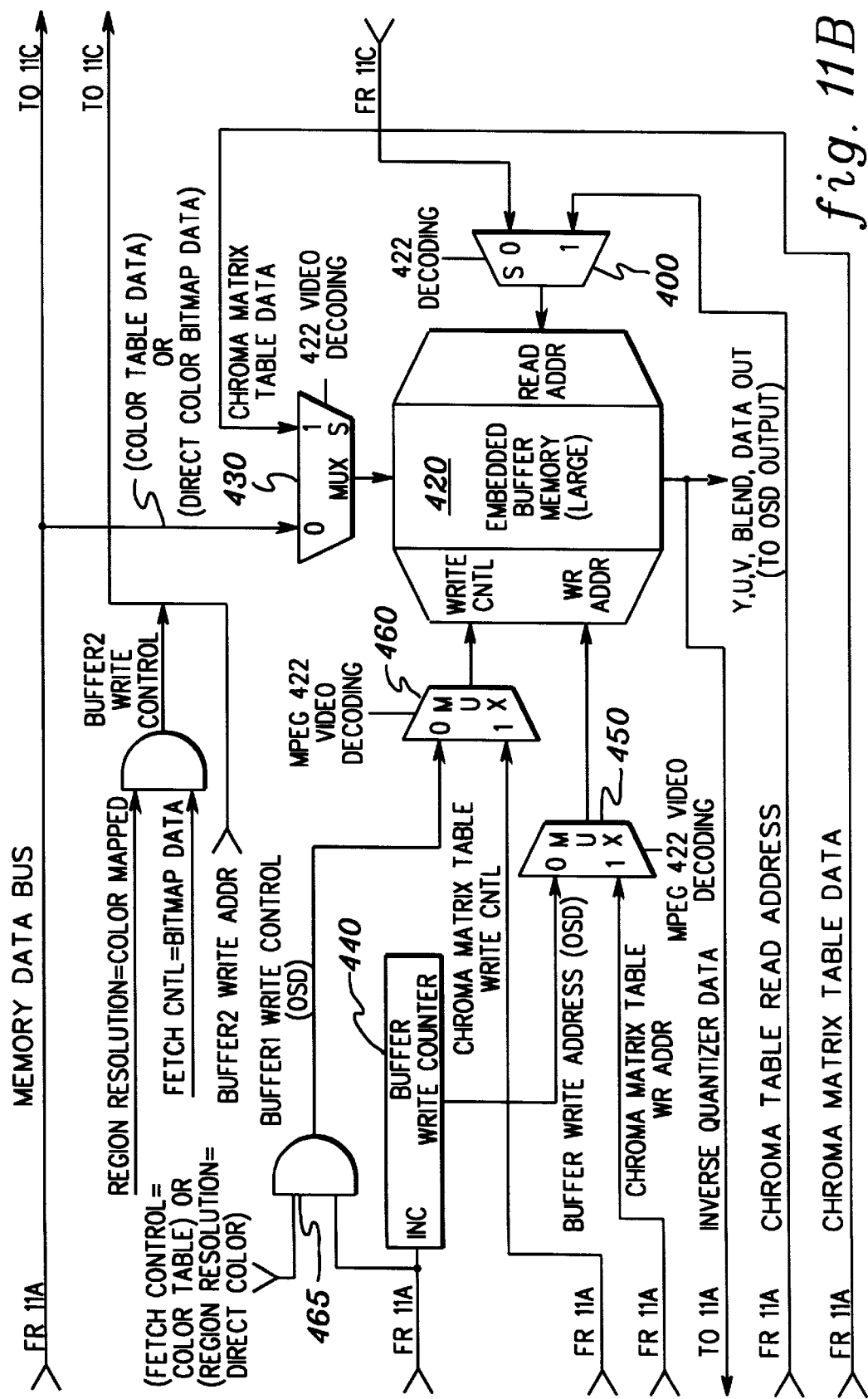
Figure 11C:
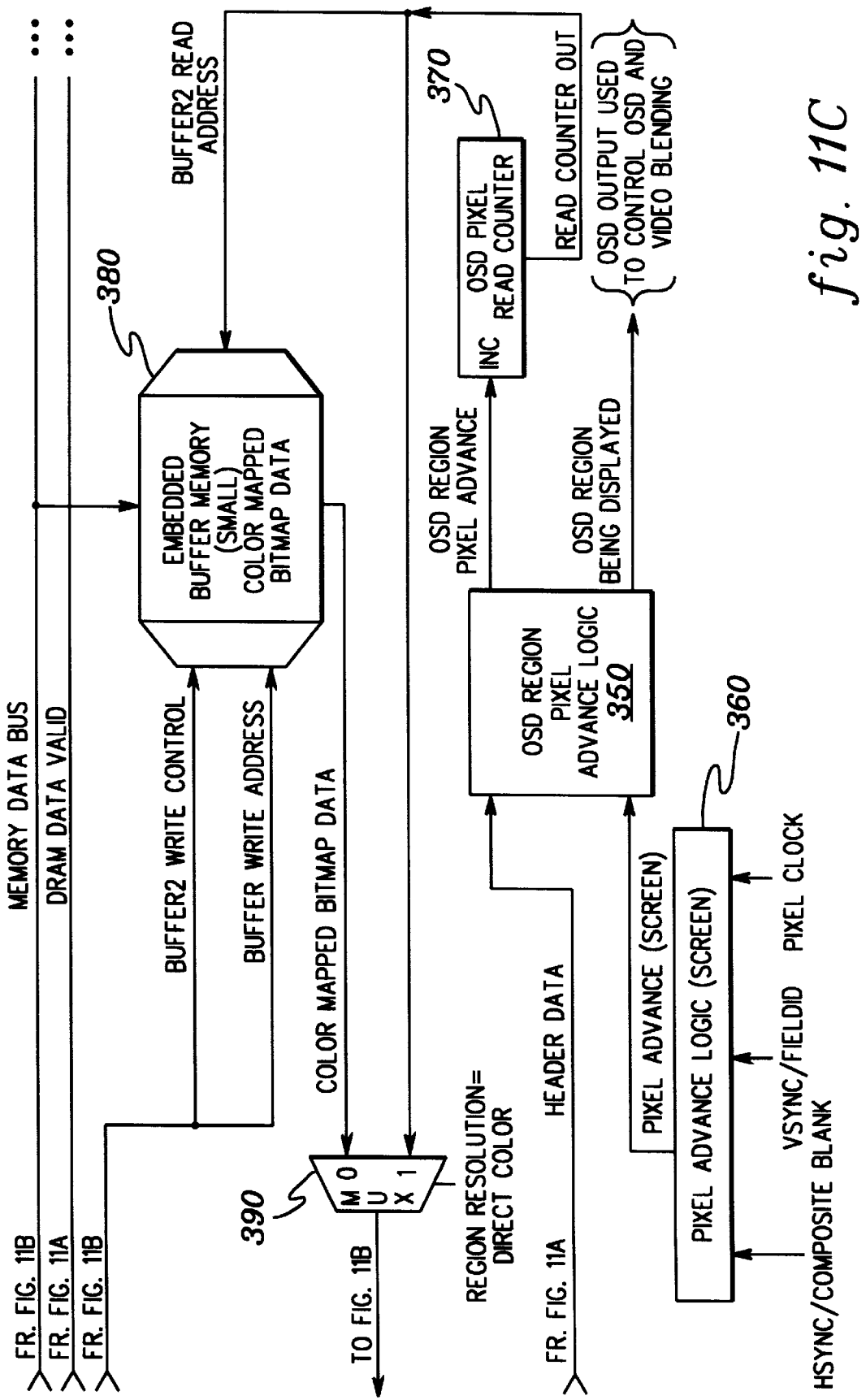

FIGS. 11a, 11b & 11c depict one detailed example of an OSD processor implemented in accordance with the present invention.

This OSD processor includes a memory interface 300 which implements a variety of logic. A memory data bus into the OSD controller passes through memory interface 300, as does a "memory data valid" signal line (DRAM data valid). Interface 300 includes request generation logic 310 and address generation logic 320. Logic 310 generates memory requests from data received from a fetch control state machine 330, for example, fetch: header; color table; or bitmap data. Address generation logic 320 identifies a memory address from which data is to be retrieved. DRAM acknowledge and memory last transfer signals are forwarded to logic 320 as well as signals from a header storage block 340 including the region horizontal size, region vertical size and region resolution. These signals play a part in the address generation. For example, the address scheme may change based on the address resolution. The address generation hardware logic 320 essentially accounts for what position of the screen is currently being processed.

Continuing with processing flow within the OSD processor, header information is received from the memory data bus and placed into header storage 340. When header information is being fetched, a "fetch state=header" signal is active as well as the "DRAM data valid" signal, allowing writing of data into the header storage 340. The header storage includes header registers: region H size, region V size, region resolution, region start coordinates and next region address. This information is output to OSD region pixel advance logic 350, which produces pulses when an OSD region is active, i.e., the OSD region may only be a portion of the screen. Logic 350 also receives input from a pixel advance logic 360. Logic 360 receives as input an H sync/composite blank, V sync/field ID, and pixel clock signals. Output from logic 350 are an "OSD region being displayed" signal which is used to control OSD and video blending, as well as an "OSD region pixel advance" signal.

The pixel advance signal is used to increment an OSD pixel read counter 370 which outputs a "read out" signal. This "read out" signal is forwarded to a first embedded buffer memory 380, which includes color mapped bitmap data. Output from memory 380 is a color mapped bitmap data signal which is forwarded to a multiplexer 390. Also input to multiplexer 390 is the "read out" signal from counter 370. As noted, the region resolution field is used in accordance with this invention to dictate whether the current region comprises a color mapped or direct color region.

Output from MUX 390 comprises one input to a second MUX 400 which also receives a signal from the inverse quantizer interface 410 coupled to the inverse quantizer (not shown) of the video decoder. This input comprises a "chroma table read address" received from the inverse quantizer when the OSD processor is to be employed in 4:2:2 profile function. Output from multiplexer 400 comprises a read address which is sent to the embedded buffer memory 420 implemented in accordance with this invention.

Color mapped bitmap data is placed into memory 380 from the memory data bus for use in indexing the color table located within memory 420 when in color mapped mode. A "buffer write address" and "buffer 2 write address control" signal are also received at memory 380. The "buffer write address" is received from a buffer write counter 440 and the "buffer 2 write control " is driven by an AND gate having inputs comprising the "DRAM data valid" signal, a "region resolution field=color mapped" signal, and a "fetch control= bitmap data" signal. The write counter indexes all the embedded memory that is used to store buffered bitmap data and color table data.

Memory 420 is the shared or embedded buffer used as described herein for processing color mapped overlay regions, direct color overlay regions, and 4:2:2 profile applications. Output from memory 420 is a luminance, chrominance, and blend data out signal which is transferred to the on-screen display processor's output, as well as being fed back to inverse quantizer interface 410 for return to the inverse quantizer, i.e., assuming the data comprises a 4:2:2 profile application.

When in color mapped mode, memory 420 receives color mapped bitmap data from memory 380 through MUXs 390 & 400. "Color table data" has already been stored into memory 420 from the memory data bus through MUX 430. Control of MUX 430 comprises a 4:2:2 video decoding signal. Also input to MUX 430 is the "chroma matrix table data" from the inverse quantizer through the inverse quantizer interface 410. When in direct color mode, direct color bitmap data is placed into memory 420 from the memory data bus.

Buffer write counter 440 is incremented by an AND gate having inputs comprising the "DRAM data valid" signal and the output of an OR gate, which has "fetch control=bitmap data" and "fetch control color table" inputs. Counter 440 output is fed to a multiplexer 450. Also input to multiplexer 450 is the "chroma matrix table write address" signal from IQ interface 410. MUX 450 outputs the write address to memory 420. The MPEG 422 video decoding signal comprises a control signal to multiplexer 450. The "write control" signal is produced by a multiplexer 460, which is controlled by the MPEG 422 video decoding signal. One input to multiplexer 460 comprises the "chroma matrix table write control" signal, and the second input comprises a "buffer write control" for OSD mode. This "buffer write control" signal is output from an AND gate 465 having input from AND gate 445 and either a "fetch control=control table" signal valid or a "region resolution=direct color" signal valid.

Those skilled in the art will note from the above discussion that an OSD controller pursuant to the present invention employs unique utilization/modification of the OSD hardware conventionally used for displaying color mapped regions in that the same hardware is also used to display OSD images coded in a direct color mode. The inclusion of direct color OSD region processing functionality using the same hardware adds to the customer perception of quality of a decoder chip produced in accordance with this invention, without significant increase in the size of the OSD controller. Furthermore, the OSD hardware described herein can be utilized to store quantizing coefficients whenever the inverse quantizer is involved in the decoding of a picture. Thus, the present invention provides a single processor capable of alternately implementing three distinct functions.

The present invention can be included, for example, in an article of manufacture (e.g., one or more computer program products) having, for instance, computer usable media. This media has embodied therein, for instance, computer readable program code means for providing and facilitating the capabilities of the present invention. The articles of manufacture can be included as part of the computer system or sold separately.

Additionally, at least one program storage device readable by machine, tangibly embodying at least one program of instructions executable by the machine, to perform the capabilities of the present invention, can be provided.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered to comprise part of the present invention as recited in the appended claims.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A digital video system comprising:
    a display screen;
    a first overlay region of said display screen comprising a color mapped, on-screen display (OSD) region; and
    a second overlay region of said display screen comprising a direct color OSD region, wherein the direct color OSD region comprises one of a 4:2:0 and a 4:2:2 bitmap format, and wherein a header is associated with each overlay region comprising direct color OSD, each header including a header field for selecting between 4:2:0 and 4:2:2 bitmap format.

2. The system of claim 1, further comprising an on-screen display processor, said on-screen display (OSD) processor comprising means for producing both said color mapped OSD region and said direct color OSD region.

3. The system of claim 2, wherein said OSD processor comprises a common embedded memory, and wherein said OSD processor comprises means for independently processing said color mapped OSD region and said direct color OSD region employing said common embedded memory.

4. The system of claim 3, further comprising external memory coupled to said OSD processor, said external memory containing OSD header and OSD data for each overlay region to be displayed on said display screen, wherein said OSD header for each overlay region contains a header field for controlling said means for processing said overlay region as color mapped or direct color within said OSD processor.

5. The system of claim 4, wherein said digital video system comprises an MPEG video decode system.

6. The system of claim 4, wherein said first overlay region and said second overlay region comprise two regions of a plurality of overlay regions, and wherein each overlay region of said display screen comprises one of a color mapped OSD region or a direct color OSD region.

7. The system of claim 6, wherein said system further comprises means for activating blending capabilities for pixels of said display screen on a pixel-by-pixel basis within each direct color OSD region.

8. The system of claim 1, wherein said display screen comprises a plurality of pixels and wherein said system further comprises means for blending/shading each pixel of said direct color OSD region independent of each other pixel of said direct color OSD region.

9. A method for displaying digital video on a display screen, said method comprising:
    providing a first overlay region on said display screen comprising a color mapped on-screen display (OSD) region, said providing of said first overlay region including employing an embedded memory of an OSD processor to produce said color mapped OSD region for display on said display screen; and
    providing a second overlay region comprising a direct color OSD region, said providing of said second overlay region including employing said embedded memory of said OSD processor to produce said direct color OSD region for display on said display screen, wherein the direct color OSD region comprises one of a 4:2:0 and a 4:2:2 bitmap format, and wherein a header is associated with each overlay region comprising direct color OSD, each header including a header field for selecting between 4:2:0 and 4:2:2 bitmap format.

10. The method of claim 9, further comprising displaying said color mapped OSD region and said direct color OSD region for simultaneous viewing on said display screen.

11. The method of claim 9, wherein said providing of said first overlay region and said providing of said second overlay region comprise alternately using said embedded memory of said OSD processor to produce said color mapped OSD region and said direct color OSD region.

12. An article of manufacture, comprising:
- at least one computer usable medium having computer readable program code means embodied therein for causing the processing of on-screen display (OSD) data employing an OSD processor with embedded memory, the computer readable program code means in the article of manufacture comprising:
  - (i) computer readable program code means for causing a computer to employ said embedded memory of said OSD processor in producing a color mapped OSD region, said color mapped OSD region being for display; and
  - (ii) computer readable program code means for causing a computer to alternately employ said embedded memory of said OSD processor to store direct color descriptions for a direct color OSD region, said direct color OSD region also being for display, wherein the direct color OSD region comprises one of a 4:2:0 and a 4:2:2 bitmap format, and wherein a header is associated with each overlay region comprising direct color OSD, each header including a header field for selecting between 4:2:0 and 4:2:2 bitmap format.

13. The article of manufacture of claim 12, wherein said color mapped OSD region and said direct color OSD region are for overlaying a common display frame of a display screen.

14. An article of manufacture comprising:
- at least one computer usable medium having computer readable program code means embodied therein for displaying digital video on a display screen, the computer readable program means in the article of manufacture comprising:
  - computer readable program code means for causing a computer to provide a first overlay region on said display screen comprising a color mapped on-screen display (OSD) region, said providing of said first overlay region including employing an embedded memory of an OSD processor to produce said color mapped OSD region for display on said display screen; and
  - computer readable program code means for causing a computer to provide a second overlay region comprising a direct color OSD region, said providing of said second overlay region including employing said embedded memory of said OSD processor to produce said direct color OSD region for display on said display screen, wherein the direct color OSD region comprises one of a 4:2:0 and a 4:2:2 bitmap format, and wherein a header is associated with each overlay region comprising direct color OSD, each header including a header field for selecting between 4:2:0 and 4:2:2 bitmap format.

* * * * *